US012735599B2

(12) United States Patent
Enomoto et al.

(10) Patent No.: US 12,735,599 B2
(45) Date of Patent: Sep. 15, 2026

(54) AQUEOUS PIGMENT DISPERSION AND INKJET INK

(71) Applicant: DIC Corporation, Tokyo (JP)

(72) Inventors: Yuuya Enomoto, Kamisu (JP); Toshihiro Seki, Kamisu (JP); Maiko Kitade, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 173 days.

(21) Appl. No.: 18/279,978

(22) PCT Filed: Mar. 31, 2022

(86) PCT No.: PCT/JP2022/016450
§ 371 (c)(1),
(2) Date: Sep. 1, 2023

(87) PCT Pub. No.: WO2022/220150
PCT Pub. Date: Oct. 20, 2022

(65) Prior Publication Data

US 2024/0174882 A1 May 30, 2024

(30) Foreign Application Priority Data

Apr. 13, 2021 (JP) ................................ 2021-067631

(51) Int. Cl.
*C09D 17/00* (2006.01)
*C09B 67/20* (2006.01)
*C09D 11/322* (2014.01)

(52) U.S. Cl.
CPC ........ *C09D 17/001* (2013.01); *C09B 67/0066* (2013.01); *C09D 11/322* (2013.01)

(58) Field of Classification Search
CPC .. C09D 17/001; C09D 11/322; C09D 17/003; C09D 11/326; C09B 67/0066;
(Continued)

(56) References Cited

U.S. PATENT DOCUMENTS 6,758,559 B1 * 7/2004 Nakano ............... C08F 290/062
347/100
2006/0189713 A1 * 8/2006 Herrmann ............ C09B 67/009
523/160
(Continued)

FOREIGN PATENT DOCUMENTS

JP 2005-060419 A 3/2005
JP 2006176759 A * 7/2006
(Continued)

OTHER PUBLICATIONS

English machine translated version of Akira et al. JP-2006176759-A (Year: 2006).*
(Continued)

*Primary Examiner* — Ricardo I Magallanes
*Assistant Examiner* — Natasha Dephenia Quinn
(74) *Attorney, Agent, or Firm* — WHDA, LLP

(57) ABSTRACT

The present invention relates to an aqueous pigment dispersion containing a bisacetoacetarylide pigment (A), a dispersant (B), and an aqueous medium (C) and having an absorbance ratio represented by (absorbance at a wavelength of 408 nm)/(absorbance at a wavelength of 450 nm) of 1.40 or more and to an inkjet ink containing the aqueous pigment dispersion.

6 Claims, 1 Drawing Sheet

(58) Field of Classification Search
CPC .............. C09B 67/0022; C09B 67/009; C09B 67/0084; C09C 1/42; C09C 1/40; C09C 1/407; C01P 2006/12; D06P 1/5221; D06P 1/5257; D06P 3/44; D06P 5/30
See application file for complete search history.

(56) References Cited

U.S. PATENT DOCUMENTS

2010/0227958 A1 9/2010 Idemura et al.
2012/0232199 A1 9/2012 Idemura et al.
2013/0095322 A1 4/2013 Maekawa et al.
2015/0259550 A1* 9/2015 Sakai ........................ D06P 1/44 427/212
2023/0167331 A1* 6/2023 Ando ..................... C09D 11/38 347/102
2023/0219360 A1* 7/2023 Chidate ................ B41M 5/0017 347/100

FOREIGN PATENT DOCUMENTS

JP 2007254735 A * 10/2007 ........... C09D 11/322
JP 2009-067866 A 4/2009
JP 2016199643 A * 12/2016
WO 2011/158606 A1 12/2011

OTHER PUBLICATIONS

English machine translated version of Demura et al. JP-2007254735-A (Year: 2007).*
English machine translation of Akira et al. (JP 2006176759 A) (Year: 2006).*
English machine translation of Demura et al. (JP 2007254735 A) (Year: 2007).*
English machine translation of Kido et al. (JP-2016199643-A) (Year: 2016).*
Mitsuhashi et al., "Inkjet Printing System for Textile Printing", Journal of the Imaging Society of Japan, 2002, vol. 41, No. 2, pp. 189-197, cited in Specification, w/English machine translation (20 pages).
International Search Report dated Jun. 7, 2022, issued in counterpart International Application No. PCT/JP2022/016450 (2 pages).
Notice of Reasons for Refusal dated Sep. 13, 2022, issued in counterpart JP Patent Application No. 2022-538422, w/English translation (4 pages).

* cited by examiner

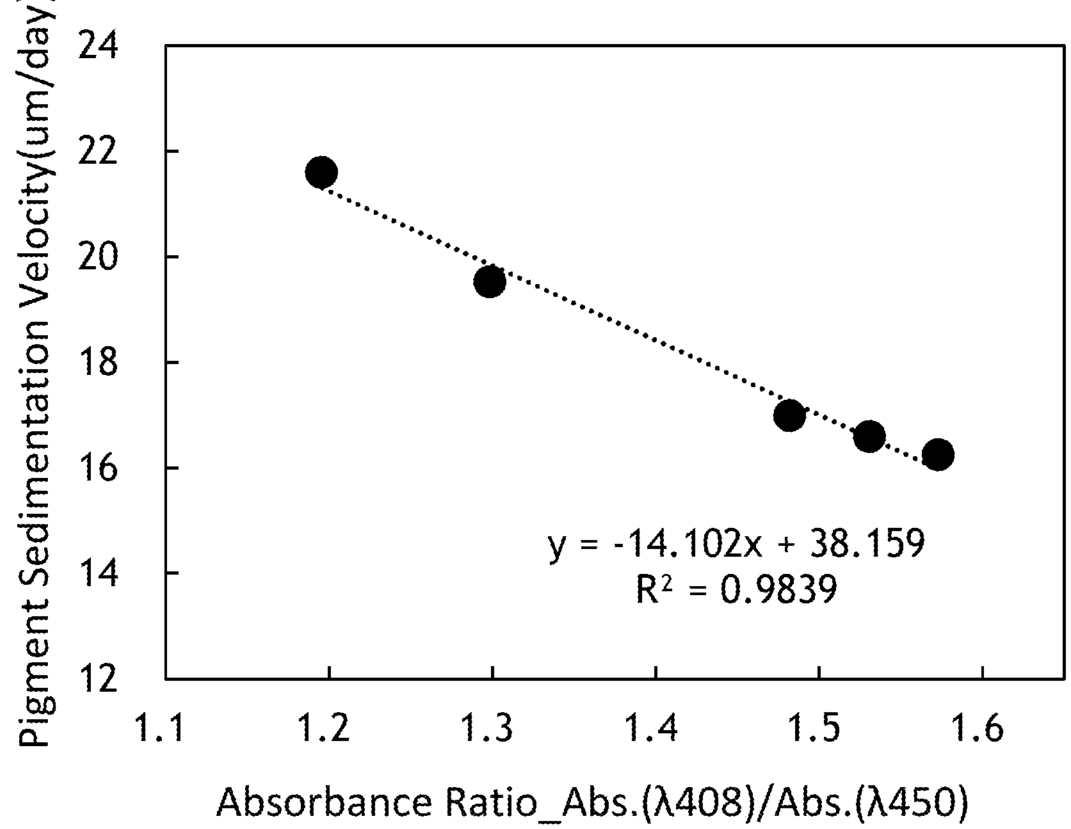
Pigment Sedimentation Velocity(um/day)
24
22
20
18
16
14
12
1.1
1.2
1.3
1.4
1.5
1.6
Absorbance Ratio_Abs.(λ408)/Abs.(λ450)
y = -14.102x + 38.159
R² = 0.9839

AQUEOUS PIGMENT DISPERSION AND INKJET INK

TECHNICAL FIELD

The present invention relates to an aqueous pigment dispersion capable of being used for inkjet printing on printing media such as textile products and to an inkjet ink prepared using the pigment dispersion.

BACKGROUND ART

It is known that aqueous inks can be used to print images such as characters, pictures, and designs on recording media including textile products such as woven fabrics, nonwoven fabrics, and knitted fabrics.

As aqueous inks, generally known are those obtained by diluting an aqueous pigment dispersion containing pigments in a high concentration with water as needed and mixing a binder resin and other additives therewith. For example, a textile printing ink for inkjet recording for use in printing on fabrics, containing a polyurethane resin as a binder resin is known (refer to PTL 1, for example).

Meanwhile, as to the method for printing the aqueous ink on recording media, a method using an inkjet recording apparatus is known as described above. The method of printing using the inkjet recording apparatus does not require plate-making for each picture or design to be printed and has advantages such as cost reduction and shorter delivery times in small lot printing and is thus being considered for application in a wide range of technical fields as a method of printing that enables high-speed and continuous printing.

For textile printing on textile products in particular, inkjet printing has attracted much attention in recent years because it facilitates readiness for shorter delivery times, high-mix low-volume production, and sample preparation (what is called mock-up). In addition, it has been reported that when resources and energy used in conventional textile printing and those when inkjet textile printing is used are compared with each other, used resources and energy can be significantly reduced by 89% in terms of the amount of water used, 41% in terms of the amount of electricity, and 61% in terms of LPG, and inkjet textile printing is superior also from the viewpoint of reducing environmental load (refer to NPL 1).

CITATION LIST

Patent Literature

PTL 1: Japanese Unexamined Patent Application Publication No. 2016-199643

Non Patent Literature

NPL 1: Taku Mitsuhashi and Takayuki Kato, "Inkjet Printing System for Textile Printing" Journal of the Imaging Society of Japan, Vol. 41, No. 2, pp. 189-197 (2002)

SUMMARY OF INVENTION

Technical Problem

However, in circumstances in which there are limitations on the type of pigments that can be used because high safety is required for inks, especially for textile printing applications that can come into contact with the skin, aqueous inkjet inks containing conventional pigments may cause ink discoloration or reduce ejection reliability due to clogging of inkjet nozzles.

An object of the present invention is to provide an inkjet ink inhibiting ink discoloration, having high ejection reliability, and capable of printing on printing media such as textile products and an inkjet pigment dispersion that can be used for the inkjet ink.

Solution to Problem

The inventors of the present invention have conducted earnest study in order to achieve the above object to find that making a sedimentation velocity of a pigment a certain value or less inhibits ink discoloration and a reduction in ejection reliability and that there is a correlation between the pigment sedimentation properties of an ink and the spectral ratio of an aqueous pigment dispersion, and the pigment sedimentation velocity can be controlled by controlling an absorbance ratio at specific wavelengths and have completed the present invention.

Specifically, the present invention relates to the following inventions.

(1) An aqueous pigment dispersion containing a bisacetoacetarylide pigment (A), a dispersant (B), and an aqueous medium (C), the aqueous pigment dispersion having an absorbance ratio represented by (absorbance at a wavelength of 408 nm)/(absorbance at a wavelength of 450 nm) of 1.40 or more.

(2) The aqueous pigment dispersion according to (1), in which the bisacetoacetarylide pigment (A) is C.I. Pigment Yellow 155.

(3) The aqueous pigment dispersion according to (1) or (2), in which the dispersant (B) is styrene-(meth)acrylate-(meth)acrylic acid-based copolymer.

(4) An aqueous inkjet ink containing the aqueous pigment dispersion according to any one of (1) to (3).

(5) The aqueous inkjet ink according to (4), used for printing on a textile product.

Advantageous Effects of Invention

The present invention can produce an aqueous inkjet ink that can be used for textile printing on textile products and the like, does not cause ink discoloration, and has high ejection reliability.

BRIEF DESCRIPTION OF DRAWING

FIG. 1 is a graph diagram illustrating a relation between the pigment sedimentation properties (sedimentation velocity; μm/day) of an ink and an absorbance ratio (Abs.(λ408)/Abs.(λ450)) of an aqueous pigment dispersion.

DESCRIPTION OF EMBODIMENTS

[Aqueous Pigment Dispersion]

The "aqueous pigment dispersion" of the present invention (hereinafter, may be referred to simply as a "pigment dispersion" or a "dispersion") contains a bisacetoacetarylide pigment (A), a dispersant (B), and an aqueous medium (C) and is used for the preparation of an inkjet ink. In the following, the "pigment (A)" may be referred to as a "component (A)" and the other components may be referred to in the same manner.

The pigment dispersion of the present invention is produced as an intermediate product for the inkjet ink and is used for inkjet printing as an aqueous inkjet ink after dilution and addition of other components as needed.

The pigment dispersion of the present invention is characterized by having an absorbance ratio represented by (absorbance at a wavelength of 408 nm)/(absorbance at a wavelength of 450 nm) of 1.40 or more.

The method of measurement and calculation is not limited to a particular method, but for example, after the pigment dispersion is diluted with water or the like to give an appropriate pigment concentration (for example, 0.0005 to 0.005 w %), an absorption spectrum on 380 nm to 700 nm is obtained using a commercially available apparatus such as a UV-visible spectrophotometer. The absorbance at a wavelength of 408 nm of the obtained spectrum is divided by the absorbance at a wavelength of 450 nm to calculate the absorbance ratio.

It has been confirmed from the study of the present invention that there is a strong correlation between the absorbance ratio of the dispersion and a sedimentation velocity of the pigment in the ink and that the sedimentation velocity being relatively small improves ejection reliability. Although the details of the correlation between the absorbance ratio and the sedimentation velocity are not clear, it is thought that a dispersion with a relatively large absorbance ratio has a fine and homogeneous dispersion system, resulting in better sedimentation properties. The absorbance ratio being 1.40 or more, preferably 1.43 or more, and more preferably 1.50 or more makes the sedimentation velocity of the pigment sufficiently small and improves ejection reliability.

The method for adjusting the absorbance ratio of the dispersion is not limited to a particular method, and a pigment dispersion having the above absorbance ratio can be obtained by adjusting as appropriate the type and content of each component in the dispersion and the method for producing the dispersion (for example, a dispersion time and a centrifugal separation supernatant collection rate). In general, a finer and more homogeneous dispersion system gives a larger absorbance ratio. The measurement of the dispersion absorbance ratio takes less time than the measurement of the sedimentation velocity of the ink pigment and can be measured using the dispersion with a general spectrophotometer, and thus it is possible to design and produce a dispersion having excellent ejection reliability simply without producing an ink (being made into an ink) and measuring the pigment sedimentation velocity.

[Bisacetoacetarylide Pigment (A)]

The bisacetoacetarylide pigment for use in the present invention has a structure represented by General Formula (1) or General Formula (2) below.

[Chemical Formula 1]

(1)

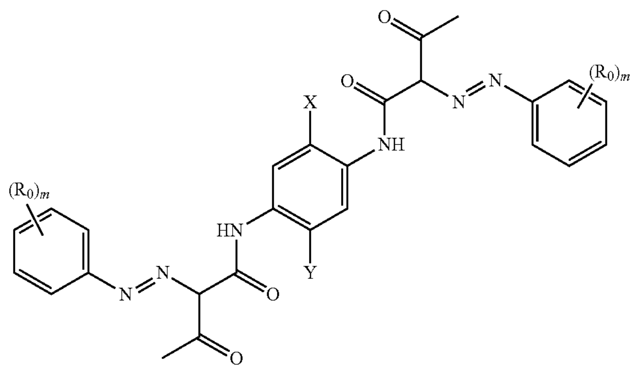

(2)

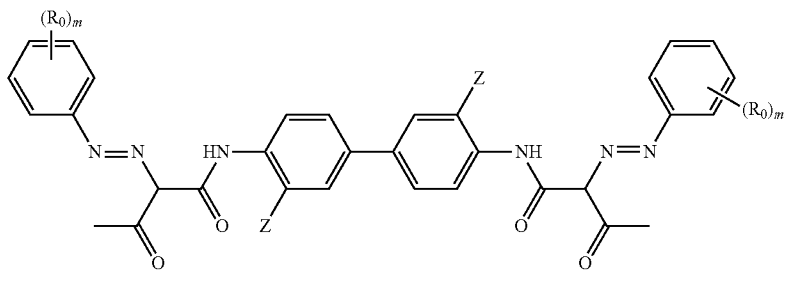

wherein $R_0$ each independently represent any of $CH_3$, $OCH_3$, $OC_2H_5$, Cl, Br, $NO_2$, and $COOCH_3$, and m is an integer of 0 to 3. X and Y each independently represent any of H, $CH_3$, $OCH_3$, and Cl, and Z represents any of $CH_3$, $OCH_3$, and Cl.

Examples of the pigment represented by General Formula (1) or General Formula (2) include C.I. Pigment Yellow 155, C.I. Pigment Yellow 16, and C.I. Pigment Yellow 98.

In particular, C.I. Pigment Yellow 155, shown in Chemical Formula (3) below, is suitable because of its color development properties and durability. In Formula (3), X and Y are the same as above.

[Chemical Formula 1]

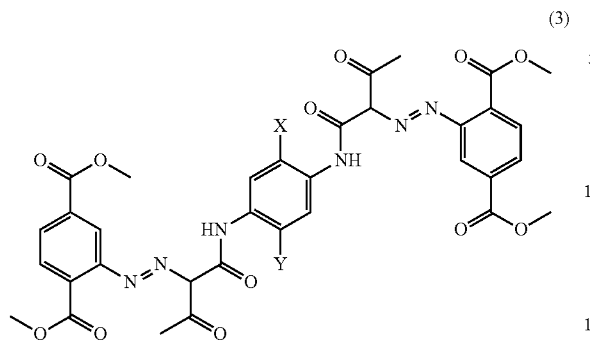

(3)

The pigment (A) is preferably a pigment having a particle size of 25 μm or less and particularly preferably a pigment having a particle size of 1 μm or less. When the particle size is within this range, the sedimentation of the pigment in the inkjet ink is less likely to occur, and pigment dispersibility is made better.

For the measurement of the particle size, values measured using, for example, a transmission electron microscope (TEM) were employed.

As the pigment (A), what is called self-dispersion type pigments having water dispersibility imparting groups such as a hydroxy group and a carboxy group on the surface of the pigment or resin-dispersion type pigments, in which the surface of the pigment is coated with dispersing resin can also be used.

In the dispersion of the present invention, the pigment concentration is preferably 10 to 30% by mass and more preferably 10 to 25% by mass. Being within these ranges can suitably achieve both ink color strength and ink ejection properties when being diluted and adjusted to be made into an inkjet ink.

[Dispersant (B)]

The dispersant (B) is used in order to stably disperse the pigment (A) in the aqueous medium (C), and examples thereof include polyvinyl alcohols; polyvinyl pyrrolidones; (meth)acrylic resins such as poly((meth)acrylic acid-co-(meth)acrylate); styrene-(meth)acrylic resins such as poly(styrene-co-(meth)acrylic acid), poly(styrene-co-(meth)acrylic acid-co-(meth)acrylate), poly(styrene-co-α-methylstyrene-co-(meth)acrylic acid), and poly(styrene-co-α-methylstyrene-co-(meth)acrylic acid-co-(meth)acrylate); aqueous resins such as poly(styrene-co-maleic acid), poly(styrene-co-maleic anhydride), and poly(vinylnaphthalene-co-acrylic acid), and salts of these aqueous resins. In the present specification, "(meth)acrylic acid" is a generic term including "acrylic acid" and "methacrylic acid," and similar expressions are the same.

Among these, dispersing resins having an anionic group such as a carboxy group are preferred due to their excellent dispersion stability, and dispersing resins having an anionic group and an aromatic group such as styrene are particularly preferred.

Specific examples of such dispersing resins having an anionic group and an aromatic group include poly(styrene-co-(meth)acrylic acid), poly(styrene-co-(meth)acrylic acid-(meth)acrylate), poly(styrene-co-α-methylstyrene-co-(meth)acrylic acid), poly(styrene-co-α-methylstyrene-co-(meth)acrylic acid-co-(meth)acrylate), poly(styrene-co-maleic acid), poly(styrene-co-maleic anhydride), and poly(vinylnaphthalene-co-acrylic acid).

When the dispersing resins having an anionic group are used, part or all of the anionic groups are preferably neutralized to form a salt. Becoming the salt can develop favorable water dispersibility.

The compound used for neutralization is not limited to a particular compound, and examples of the compound that can be used for neutralization include ammonia; metal hydroxides such as sodium hydroxide, potassium hydroxide, and lithium hydroxide; organic amines such as alkylamines such as methylamine, ethylamine, n-butylamine, dimethylamine, diethylamine, trimethylamine, triethylamine, and tri-n-butylamine; hydroxyamines such as N-methylaminoethanol, N,N-dimethylaminoethanol, N,N-diethylaminoethanol, 2-amino-2-methylpropanol, diethanolamine, and triethanolamine; and polyvalent amines such as ethylenediamine and diethylenetriamine. In particular, the dispersion resins preferably form potassium salts, and potassium hydroxide is preferably used for neutralization.

As the dispersant (B), commercially available products can also be used, and examples thereof include the Ajisper PB series manufactured by Ajinomoto Fine-Techno Co., Inc.; the Disperbyk series manufactured by BYK-Chemie Japan K.K.; the EFKA series and the JONCRYL series manufactured by BASF; the SOLSPERSE series manufactured by Lubrizol Japan Limited; the TEGO series manufactured by Evonik Industries AG; and the Acrydic series manufactured by DIC Corporation.

The mass average molecular weight of the dispersant (B) is preferably 500 to 100,000, more preferably 1,000 to 10,000, and particularly preferably 1,500 to 8,000 in view of making the pigment dispersion have moderate viscosity and easily making dispersion stability favorable.

The acid value of the dispersant (B) is preferably 80 to 350 mgKOH/g, more preferably 80 to 225 mgKOH/g, and even more preferably 80 to 200 mgKOH/g. By making it within this range, the dispersant's hydrophilicity and pigment adsorption properties are balanced, and the dispersion stability of the pigment dispersion improves.

The dispersant (B) has a number average molecular weight of in a range of preferably 1,000 to 6,000, more preferably 1,300 to 5,000, and even more preferably 1,500 to 4,500. By making it within this range, flocculation or the like of the pigment (A) in the aqueous medium (C) can be effectively inhibited, and the pigment (A) can be favorably dispersed.

In the pigment dispersion of the present invention, the dispersant (B) is contained in the pigment in an amount of preferably 5 to 100% by mass and more preferably 10 to 80% by mass with respect to the pigment in terms of nonvolatile content. Being within these ranges can inhibit a reduction in the dispersion stability of the pigment dispersion due to excess or deficiency of the dispersant and can maintain a stable condition even during long-term storage.

[Aqueous Medium (C)]

The aqueous pigment dispersion of the present invention further contains an aqueous medium in order to prepare viscosity suitable for pumping transportation of the aqueous pigment dispersion and filtering of the aqueous pigment dispersion.

As the aqueous medium, water may be used alone, or a mixed solvent of water and an organic solvent may be used.

Examples of the water include pure water such as ion exchanged water, ultrafiltered water, reverse osmosis water, and distilled water and ultrapure water.

Examples of the organic solvent include ketones such as acetone, methyl ethyl ketone, and methyl isobutyl ketone; alcohols such as methanol, ethanol, 1-propanol, 2-propanol, 2-methyl-1-propanol, and 2-methoxyethanol; ethers such as tetrahydrofuran, 1,4-dioxane, and 1,2-dimethoxyethane; glycols such as dimethylformamide, N-methyl pyrrolidone, ethylene glycol, diethylene glycol, triethylene glycol, tetraethylene glycol, propylene glycol, polyethylene glycol, and polypropylene glycol; diols such as butanediol, pentanediol, hexanediol, and diols homologous to these; glycol esters such as propylene glycol laurate; glycol ethers such as diethylene glycol monoethyl ether, diethylene glycol monobutyl ether, diethylene glycol monohexyl ether, propylene glycol ether, dipropylene glycol ether, cellosolve, and triethylene glycol ether; alcohols such as butyl alcohols such as 1-butanol and 2-butanol, pentyl alcohol, and alcohols homologous to these; sulfolane; lactones such as γ-butyrolactone; and lactams such as N-(2-hydroxyethyl)pyrrolidone. They may be used alone or in combination of two or more.

<Other Optional Components>

The pigment dispersion of the present invention may contain other optional components in addition to the component (A) to the component (C) to the extent that the effects of the present invention are not impaired.

Examples of the other components include other resins, surfactants, waxes, low surface tension organic solvents, wetting agents, penetrating agents, antifoaming agents, antiseptics, viscosity adjusting agents, pH adjusting agents, chelating agents, plasticizers, antioxidants, and UV absorbers other than the above components.

As the other resins, aqueous resins suitable for preparing the pigment dispersion are good, and preferred examples thereof include polyvinyl alcohols; polyvinyl pyrrolidones; (meth)acrylic resins such as poly((meth)acrylic acid-co-(meth)acrylate); styrene-(meth)acrylic resins such as poly(styrene-co-(meth)acrylic acid), poly(styrene-co-(meth)acrylic acid), poly(styrene-co-(meth)acrylic acid-co-(meth)acrylate), poly(styrene-co-α-methylstyrene-co-(meth)acrylic acid), and poly(styrene-co-α-methylstyrene-co-(meth)acrylic acid-co-(meth)acrylate); poly(styrene-co-maleic acid), poly(styrene-co-maleic anhydride), poly(vinylnaphthalene-co-acrylic acid), urethane resins, and salts of the aqueous resins, which do not fall under the above components.

Examples of the surfactant include anionic surfactants, nonionic surfactants, cationic surfactants, and amphoteric surfactants, and among these, anionic surfactants and nonionic surfactants are preferable.

Examples of the anionic surfactants include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates, and specific examples thereof include dodecylbenzene sulfonate, isopropylnaphthalene sulfonate, monobutylphenylphenol monosulfonate, monobutylbiphenyl sulfonate, and dibutylphenylphenol disulfonate.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, polyethylene glycol-polypropylene glycol block copolymers, and alkylphenol ethoxylates, and preferred among these are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, polyethylene glycol-polypropylene glycol block copolymers, and alkylphenol ethoxylates.

Other examples of the surfactant are silicone surfactants such as polysiloxane oxyethylene adducts; fluorosurfactants such as perfluoroalkyl carboxylates, perfluoroalkyl sulfonates, and oxyethylene perfluoroalkyl ethers; and biosurfactants such as spiculisporic acid, rhamnolipids, and lysolecithin.

These surfactants can be used alone or as a mixture of two or more. Considering the dissolution stability and the like of the surfactant, its HLB is preferably in a range of 7 to 20.

Examples of commercially available fluorosurfactants include Novec FC-4430 and FC-4432 (manufactured by Sumitomo 3M Ltd.), Zonyl FSO-100, FSN-100, FS-300, and FSO (manufactured by Du Pont), Eftop EF-122A, EF-351, 352, 801, and 802 (manufactured by Gemco), Megafac F-470, F-1405, F474, and F-444 (manufactured by DIC Corporation), Surflon S-111, S-112, S-113, S121, S131, S132, S-141, and S-145 (manufactured by Asahi Glass Co., Ltd.), the Ftergent series (manufactured by Neos Company Limited), the Fluorad FC series (manufactured by Minnesota Mining and Manufacturing Company), Monflor (manufactured by Imperial Chemical Industries), and the Licowet VPF series (manufactured by Farbewerke Hoechst AG).

Examples of the silicone surfactants include KF-351A, KF-642, Olfine PD-501, Olfine PD-502, and Olfine PD-570 (manufactured by Shin-Etsu Chemical Co., Ltd.) and BYK 347 and BYK 348 (manufactured by BYK-Chemie Japan K.K.).

Examples of the polyoxyethylene alkyl ether surfactants include the BT series (Nikko Chemicals Co., Ltd.), the Nonipol series (Sanyo Chemical Industries, Ltd.), the D- and P-series (Takemoto Oil & Fat Co., Ltd.), the EMALEX DAPE series (Nihon Emulsion Co., Ltd.), and the Pegnol series (Toho Chemical Industry Co., Ltd.). Examples of the polyethylene glycol alkyl ester-based one include Pegnol (Toho Chemical Industry Co., Ltd.).

Examples of the acetylene glycol surfactants include Olfine E1010, STG, and Y (manufactured by Nissin Chemical Co., Ltd.) and Surfynol 104, 82, 420, 440, 465, 485, and TG (manufactured by Air Products and Chemicals Inc.).

Examples of the waxes include waxes such as plant and animal waxes such as carnauba wax, candelilla wax, beeswax, rice wax, and lanolin; mineral waxes such as montan wax and ozokerite; paraffin waxes, or what are called petroleum waxes; synthetic waxes such as carbon waxes, Hoechst wax, polyolefin waxes, silicone waxes, and stearic acid amide; natural and synthetic wax emulsions such as poly(α-olefin-co-maleic anhydride); and blended waxes. These waxes have the effect of imparting slipping properties to the surface of a formed recorded product and improving abrasion resistance. These waxes can be used alone or as a mixture of a plurality of ones. Among these, silicone waxes, polyolefin waxes, and paraffin waxes are preferably used.

Examples of commercially available products of the silicone waxes include SM 8706 EX, SM 7036 EX, SM 7060 EX, SM 7025 EX, SM 490 EX, SM 8701 EX, SM 8709 SR, SM 8716 SR, IE-7045, IE-7046T, SH 7024, BY22-744EX, BY22-818EX, FZ-4658, FZ-4634EX, and FZ-4602 (product names, manufactured by Dow Corning Toray Co., Ltd.) and POLON-MF-14, POLON-MF-14EC, POLON-MF-23, POLON-MF-63, POLON-MF-18T, POLON-MF 56, POLON-MF-49, POLON-MF-33A, POLON-MF-55T, POLON-MF-28T, POLON-MF-50, POLON-MK-206, POLON-SR-CONC, KM-9771, KM-9774, KM-2002-T, KM-2002-L-1, KM-9772, KS-7002, KS-701, and X-51-1264 (product names, manufactured by Shin-Etsu Chemical Co., Ltd.).

Examples of the polyolefin waxes include waxes and copolymers produced from olefins such as ethylene, propylene, and butylene or derivatives thereof and copolymers thereof and specifically polyethylene waxes, polypropylene waxes, and polybutylene waxes. The polyolefin waxes can be used alone or in combination of two or more. Among these, polyethylene waxes are preferred from the viewpoint that they are less likely to react with cross-linking groups of urethane resin particles having the above cross-linking groups and capable of providing excellent ejection stability.

Examples of commercially available products of the polyolefin waxes include the AQUACER series such as AQUACER 513 (polyethylene wax, average particle size: 100 nm or more and 200 nm or less, melting point: 130° C., solid content: 30%), AQUACER 507, AQUACER 515, AQUACER 840, and AQUACER 1547 (product names, manufactured by BYK-Chemie Japan K.K.), the Hitec series such as Hitec E-7025P, Hitec E-2213, Hitec E-6500, Hitec E-6314, Hitec E-9460, Hitec E-9015, Hitec E-4A, Hitec E-5403P, and Hitec E-8237 (product names, manufactured by Toho Chemical Industry Co., Ltd., polyethylene waxes), Nopcoat PEM-17 (product name, manufactured by San Nopco Ltd., polyethylene emulsion, average particle size: 40 nm), and ULTRALUBE E-843N (product name, manufactured by Keim-Additec Surface GmbH, polyethylene wax).

The paraffin waxes are what are called petroleum waxes. The paraffin means an alkane with a carbon atom number of 20 or more, and the paraffin wax refers to a mixture of hydrocarbons with a molecular weight of about 300 to 500, containing mainly a linear paraffinic hydrocarbon with a carbon number of 20 or more and 30 or less and containing small amounts of iso-paraffins. The ink containing the paraffin waxes imparts slipping properties and water repellency to a recorded product, thereby improving abrasion resistance.

Examples of commercially available products of the paraffin waxes include AQUACER 537 and AQUACER 539 (product names, manufactured by BYK-Chemie Japan K.K.).

The wax is preferably contained in the pigment dispersion in a particulate state, that is, in an emulsion state or suspension state. This makes it easier to adjust the viscosity of the ink to be in a proper range for ejection using an inkjet head and also makes it easier to ensure ejection stability and intermittent ejection characteristics during recording.

Examples of low surface tension organic solvents include, as glycol ether compounds, diethylene glycol mono ($C_{1-9}$ alkyl) ethers, triethylene glycol mono($C_{1-8}$ alkyl) ethers, propylene glycol mono($C_{1-6}$ alkyl) ethers, and dipropylene glycol mono($C_{1-6}$ alkyl) ethers, one of which or a mixture of two or more of which can be used.

Specific examples thereof include ethylene glycol monomethyl ether, ethylene glycol monoethyl ether, ethylene glycol mono-iso-propyl ether, ethylene glycol monobutyl ether, ethylene glycol mono-t-butyl ether, diethylene glycol monomethyl ether, diethylene glycol monoethyl ether, diethylene glycol monopropyl ether, diethylene glycol mono-iso-propyl ether, diethylene glycol monobutyl ether, diethylene glycol mono-t-butyl ether, diethylene glycol monopentyl ether, diethylene glycol monohexyl ether, diethylene glycol monoheptyl ether, diethylene glycol monooctyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, triethylene glycol monoheptyl ether, triethylene glycol monooctyl ether, propylene glycol monomethyl ether, propylene glycol monoethyl ether, propylene glycol monopropyl ether, propylene glycol mono-iso-propyl ether, propylene glycol monobutyl ether, propylene glycol mono-t-butyl ether, propylene glycol monopentyl ether, propylene glycol monohexyl ether, dipropylene glycol monomethyl ether, dipropylene glycol monoethyl ether, dipropylene glycol monopropyl ether, dipropylene glycol mono-iso-propyl ether, dipropylene glycol monobutyl ether, dipropylene glycol monopentyl ether, and dipropylene glycol monohexyl ether.

Glycol ethers, surfactants, and the like can be used as surface tension adjusting agents to prepare the surface tension of the ink. Specifically, they can be added as appropriate so that the surface tension of the ink is 15 mN/m to 30 mN/m or less, and the addition amount of the surfactant is in a range of preferably about 0.1 to 10% by mass and more preferably 0.3 to 2% by mass with respect to the aqueous pigment dispersion. The surface tension is more preferably in a range of 16 to 28 and most preferably in a range of 18 to 25.

There is no particular limitation as the wetting agents, but preferred is one having miscibility with water and producing a clogging prevention effect on inkjet printer heads. Examples thereof include glycerin; diol compounds such as ethylene glycol, diethylene glycol, triethylene glycol, polyethylene glycol with a molecular weight of 2,000 or less, propylene glycol, dipropylene glycol, tripropylene glycol, 1,3-propylene glycol, isopropylene glycol, isobutylene glycol, 1,2-butanediol, 1,4-butanediol, 1,2-pentanediol, 1,5-pentanediol, 1,2-hexanediol, 1,6-hexanediol, 2-methylpentane-2,4-diol, 1,2-heptanediol, 1,2 nonanediol, 1,2-octanediol, 1,2-hexanediol, 1,2-heptanediol, 1,2-nonanediol, and 1,2-octanediol; 1,4-butanediol, 1,3-butanediol, meso-erythritol, pentaerythritol; and nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam. Among these, containing propylene glycol and 1,3-butyl glycol has safety and produces excellent effects on ink drying properties and ejection performance.

The content of the wetting agents in the ink is preferably 3 to 50% by mass.

Examples of the penetrating agents include lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether. The content of the penetrating agents in the pigment dispersion is preferably 0.01 to 10% by mass.

<Method for Producing Pigment Dispersion>

The method for producing the pigment dispersion in the present invention is not limited in any way.

The components (A) to (C) and optional components to be added as needed may be dispersed to form a pigment dispersion, or a pigment dispersion mill base liquid with a high pigment concentration may be prepared with part of the components (A), (B) and (C), a medium, and the like in advance, to which optional components may be added as appropriate, which may be diluted with an aqueous medium such as the component (C) to form a pigment dispersion for the preparation of an aqueous inkjet ink. The pigment dispersion mill base liquid is produced in advance by dispersing the pigment using a stirring and dispersing apparatus, then the pigment dispersion is produced, and thereby an aqueous pigment dispersion with the pigment dispersed with a desired volume average particle size can be easily obtained.

The following describes the method of producing the pigment dispersion mill base liquid and then forming the pigment dispersion, which is the latter.

Examples of the method for producing the pigment dispersion mill base liquid include the following methods.

(1) A method for preparing the pigment dispersion mill base liquid by adding a pigment to an aqueous medium containing a dispersant as needed and then dispersing the pigment in the aqueous medium using a stirring and dispersing apparatus.

(2) A method for preparing the pigment dispersion mill base liquid by kneading a pigment and a dispersant as needed using a kneader such as a two-roll or a mixer, adding the obtained kneaded product into an aqueous medium, and using a stirring and dispersing apparatus.

(3) A method for preparing the pigment dispersion mill base liquid by adding a pigment to a solution obtained by dissolving a pigment dispersant in an organic solvent having compatibility with water, such as 2-propyl alcohol, methyl ethyl ketone, or tetrahydrofuran, then dispersing the pigment in the organic solution using a stirring and dispersing apparatus, then performing phase inversion emulsification using an aqueous medium, and then distilling off the organic solvent.

Examples of the stirring and dispersing apparatus include ultrasonic homogenizers, high-pressure homogenizers, paint shakers, ball mills, roll mills, sand mills, sand grinders, dyno mills, Dispermat, SC mills, and nanomizers, and one of these may be used alone, or two or more apparatuses may be used in combination.

<Inkjet Ink>

Using the pigment dispersion of the present invention, it is diluted with an aqueous medium so as to give a pigment content of 1 to 30% by mass to make an aqueous inkjet ink. This aqueous medium may be water, a mixture of water and an organic solvent, or only an organic solvent, as in the component (C).

The aqueous medium can also contain optional components of the pigment dispersion.

The viscosity of the inkjet ink of the present invention is desirably produced in a range of 1 to 20 mPa·s at 25° C. from the viewpoint of ejection reliability.

The inkjet ink of the present invention preferably has a pigment sedimentation velocity in the aqueous pigment dispersion calculated by the following expression of 18.5 μm/day or less under atmospheric pressure at 25° C. The pigment sedimentation velocity being 18.5 μm/day or less (especially preferably 18.0 μm/day or less) inhibits ink discoloration and can make an ink having high ejection reliability.

Pigment sedimentation velocity (μm/day@1 G)=Velocity in (μm/s)/Mean RCA in (g)×86,400

(Method for Measuring Pigment Sedimentation Velocity)

Specifically, the pigment sedimentation velocity can be measured, for example, as follows.

Measurement was performed using a multi-sample, dispersibility evaluation particle size distribution measurement apparatus LUMiSizer LS651R and analysis software SEPView6 manufactured by LUM. A polycarbonate cell (110 to 131xx) with a light path length of 2 mm was filled with the ink in an amount of 340 μl each, and after being lidded, the cell was set in the rotor of the measurement apparatus. Measurement was started with the measurement conditions set as follows:

Temperature in ° C.: 25
Wavelength: 870 nm
Profiles: 60
Interval in s: 300
Speed in RPM: 4,000
Light Factor: 1.00

After the measurement was completed, the pigment sedimentation velocity was calculated by Front Tracking of data analysis software SEPView6. The analysis conditions are as follows:

Range from in mm: 114
Range to in mm: 124
Threshold in %: 40
Start in s: 0
End in s: 18,000

The calculated velocity (Velocity in μm/s) was converted to velocity per day under a gravitational acceleration of 1G by Expression 0 below and was determined to be the pigment sedimentation velocity of the ink.

Pigment sedimentation velocity (μm/day@1 G)=Velocity in (μm/s)/Mean RCA in (g)×86,400 (Expression 0)

The inkjet ink of the present invention has excellent printability on various base materials, has excellent printability especially on textile products, and can thus be suitably used for textile printing inkjet printing on textile products such as textiles (fabrics), knitted fabrics (knits), yarn, and clothing.

EXAMPLES

The following describes the present invention specifically with reference to examples and comparative examples. In the following, unless otherwise specified, "parts" means "parts by mass" and "%" means "% by mass."

Example 1

<Production of Pigment Dispersion>

Charged into a 10 L SUS cylindrical pot were 153.91 g of a 25% aqueous KOH solution, 2,898.89 g of ion exchanged water, 248.01 g of 2-propyl alcohol, and 659.19 g of poly(styrene-co-acrylate-co-methacrylic acid) ("Acrydic WML-542" manufactured by DIC Corporation, acid value: 167 mgKOH/g, effective component: 43.69%), which were stirred for 30 minutes.

Subsequently, 1,440 g of P.Y.-155 Pigment; INKJET YELLOW 4GC (manufactured by Clariant Japan) was added thereto, and the mixture was stirred for another 30 minutes to obtain a pigment-resin mixed slurry (A).

The pigment-resin mixed slurry (A) was subjected to circulation processing for 3 hours in an inline disperser LABOR-PILOT (manufactured by IKA, 7,941 rpm) to obtain a pigment premixed slurry (B).

The obtained pigment premixed slurry (B) was adjusted with ion exchanged water so as to give a nonvolatile content of 28%, and dispersion processing was performed with a bead mill disperser SC-100 (manufactured by Nippon Coke & Engineering Co., Ltd., SM rotor, 45 Hz) to obtain a solvent-containing pigment dispersion (C-1) with a spectral ratio of 1.440.

The solvent-containing pigment dispersion (C-1) was diluted with ion exchanged water to a nonvolatile content of 17% and was heated up to 100° C. to distill off part of the contained solvent and water and to obtain a desolvated pigment dispersion (D-1) with a nonvolatile content of 24%.

The desolvated pigment dispersion (D-1) was subjected to centrifugal separation processing (6,000 G, 30 minutes) to collect the supernatant, which was 94% with respect to the entire amount of the processing liquid, thereby obtaining a pigment dispersion (E-1) of Example 1.

Examples 2 and 3 and Comparative Examples 1 and 2

Pigment dispersions (E-2) and (E-3) of Examples 2 and 3 and pigment dispersions (HE-1) and (HE-2) of Comparative Examples 1 and 2 were obtained in the same manner as in Example 1 above except that the dispersion processing time of the pigment premixed slurry (B) in the disperser and the centrifugal separation processing time and the collection amount from the centrifugal separation of the desolvated pigment dispersion (D-1) were changed.

Examples 4 to 6 and Comparative Examples 3 and 4

[Production of Inkjet Ink]

By mixing together 25 parts by mass of the pigment dispersions (E-1) to (E-3) or (HE-1) and (HE-2) with a pigment content of 16%, 20 parts by mass of a urethane resin composition with an effective component of 35%, 1 part by mass of an acetylene surfactant ("Surfynol 440" manufactured by Evonik Industries AG), 20 parts by mass of glycerin, 4.6 parts by mass of triethylene glycol, 1 part by mass of 3-methyl-1,5-pentanediol, 0.5 part by mass of a pH adjusting agent (triethanolamine), 0.05 part by mass of an antiseptic ("ACTICIDE B-20" manufactured by Thor Japan), and 27.85 parts by mass of ion exchanged water, inkjet inks (I-1) to (I-3) of Examples 4 to 6 and inkjet inks (HI-1) and (HI-2) of Comparative Examples 3 and 4 were obtained.

(Absorbance Ratio Measurement)

The pigment dispersion (E-1) was diluted with ion exchanged water so as to give a pigment content of 0.002%, and an absorption spectrum was measured on 380 nm to 700 nm with a UV-visible spectrophotometer. Using the obtained spectrum, (absorbance at a wavelength of 408 nm)/(absorbance at a wavelength of 450 nm) was calculated, and the absorbance ratio was 1.482. The absorbance ratio was determined for the pigment dispersions (E-2) and (E-3) and (HE-1) and (HE-2) in the same manner.

(Sedimentation Properties Evaluation)

Using the inkjet ink (I-1), the pigment sedimentation velocity was measured in accordance with "(Method for Measuring Pigment Sedimentation Velocity)" described above and was 16.99 μm/day@1 G. The pigment sedimentation velocity was determined for the inkjet inks (I-2) and (I-3) and (HI-1) and (HI-2) in the same manner.

FIG. 1 illustrates a graph diagram plotting the absorbance ratio x versus the pigment sedimentation velocity y (μm/day@1 G) determined above. Consequently, there is a strong correlation between the sedimentation properties of the pigment and the absorbance ratio of the dispersion, with an approximate curve of $y=-14.102x+38.159$. Consequently, it has been confirmed that the pigment sedimentation velocity is 18.5 or less when the absorbance ratio is 1.40 or more.

TABLE 1

| Experimental examples | Pigment dispersion | Ink | Spectral ratio | Sedimentation velocity |
|---|---|---|---|---|
| Example 1 | E-1 | I-1 | 1.482 | 16.99 |
| Example 2 | E-2 | I-2 | 1.531 | 16.59 |
| Example 3 | E-3 | I-3 | 1.573 | 16.25 |
| Comparative Example 1 | HE-1 | HI-1 | 1.196 | 21.60 |
| Comparative Example 2 | HE-2 | HI-2 | 1.298 | 19.53 |

<Evaluation of Inkjet Ejection Reliability>

An inkjet head KJ4B-YH manufactured by Kyocera Corporation was filled with each of the inkjet inks obtained in the examples and the comparative examples, and supply pressure was adjusted by setting the head difference of an ink sub-tank from a head nozzle plate face to +35 cm and setting negative pressure to −5.0 kPa. The head drive conditions were set to the standard voltage and the standard temperature of the inkjet head, the droplet size was set to 18 pL, and a grid-like nozzle check pattern was printed at 20 kHz. After being left at rest for 30 minutes, the nozzle check pattern was printed again, and the appearance of the printed product was checked to determine inkjet ejection reliability.

A: The check pattern can be printed without any lack.

B: There are lacks on the check pattern or the check pattern cannot be printed.

TABLE 2

| | Example 4 | Example 5 | Example 6 | Comparative Example 3 | Comparative Example 4 |
|---|---|---|---|---|---|
| Ink | I-1 | I-2 | I-3 | HI-1 | HI-2 |
| Ejection reliability | A | A | A | B | B |

As is clear from the above results, it has been confirmed that the inkjet inks of Examples 4 to 6 using the pigment dispersions of Examples 1 to 3, respectively, according to the present invention have excellent ejection reliability, whereas the inkjet inks of Comparative Examples 3 and 4 using the pigment dispersions of Comparative Examples 1 and 2, respectively, with an absorbance ratio of less than 1.40 have inferior ejection reliability.

The invention claimed is:

1. An aqueous inkjet ink for printing on a textile product comprising an aqueous pigment dispersion, comprising:

a bisacetoacetarylide pigment (A) which is C.I. Pigment Yellow 155;

a dispersant (B) which is styrene-(meth)acrylate-(meth) acrylic acid-based copolymer; and an aqueous medium (C), the aqueous pigment dispersion having an absorbance ratio represented by (absorbance at a wavelength of 408 nm)/(absorbance at a wavelength of 450 nm) of 1.40 or more, wherein a pigment sedimentation velocity is 18.5 μm/day or less.

2. The aqueous inkjet ink according to claim 1, wherein a mass average molecular weight of the dispersant (B) is 1,500 to 8,000.

3. The aqueous inkjet ink according to claim 1, wherein an acid value of the dispersant (B) is in a range of 167 to 350 mg KOH/g.

4. The aqueous inkjet ink according to claim 1, further comprising at least one selected from the group consisting of glycerin, triethylene glycol, and 3-methyl-1,5-pentanediol.

5. The aqueous inkjet ink according to claim 1, further comprising a urethane resin.

6. The aqueous inkjet ink according to claim 1, further comprising an acetylene glycol surfactant.

* * * * *